Patented Feb. 12, 1952

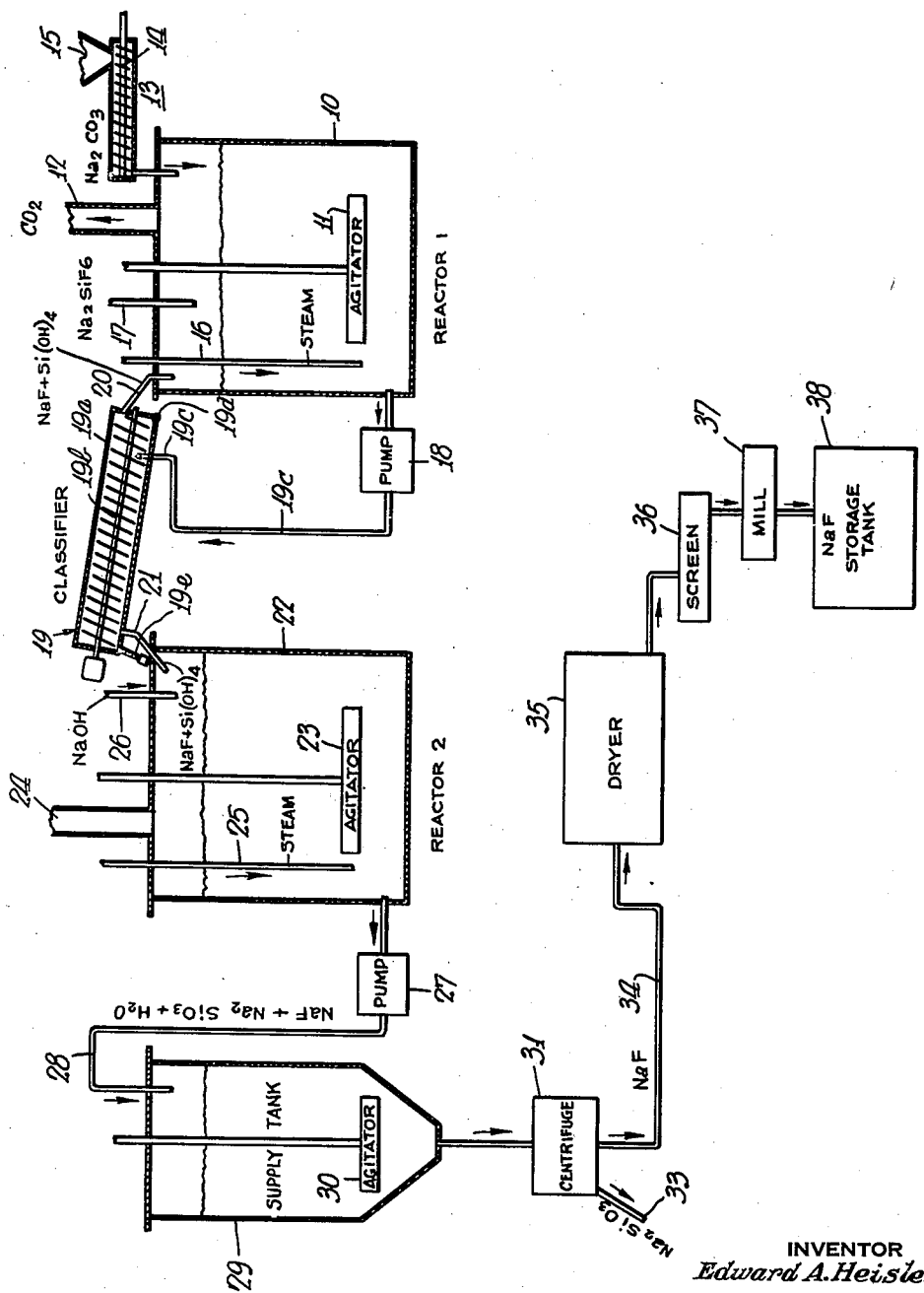

2,585,387

UNITED STATES PATENT OFFICE 2,585,387

PRODUCTION OF SODIUM FLUORIDE

Edward A. Heisler, Folsom, Pa., assignor to Allied Chemical & Dye Corporation, New York, N. Y., a corporation of New York Application July 8, 1950, Serial No. 172,637

5 Claims. (Cl. 23—88)

This invention relates to the production of sodium fluoride from sodium fluosilicate.

Prior to my invention sodium fluoride has been manufactured commercially by continuously neutralizing soda ash solution with either aqueous or anhydrous hydrofluoric acid. The reaction of sodium fluosilicate with soda ash to produce sodium fluoride and silicic acid followed by treatment of the resultant reaction mixture with caustic soda to effect separation of the sodium fluoride from the soluble sodium silicate thus produced has also been suggested (United States Patents 1,382,165 and 1,634,122). To the best of my knowledge and belief, the latter suggestion has not been adopted commercially, presumably because the suggested procedures appear to be batch processes not conducive to the economic production of sodium fluoride.

It is an object of this invention to provide a continuous process of producing sodium fluoride from sodium fluosilicate including sodium fluosilicate obtained as a by-product in the production of phosphoric acid or fertilizers, which process is efficient in operation and economical to carry out.

Another object is to provide such process which results in exceptionally large cube-shaped crystals.

Other objects and advantages of this invention will be apparent from the following detailed description thereof.

In accordance with this invention, sodium fluosilicate, which may be a by-product from phosphoric acid or fertilizer manufacture, in dry form or in the form of an aqueous slurry containing at least 30% by weight of sodium fluosilicate is fed continuously into a reaction zone into which is also continuously introduced soda ash in amount to maintain the pH of the reaction mixture within the range of 6 to 9. The reaction mixture is continuously agitated and maintained at a temperature within the range of 150° F. to 220° F. A concentration of from 30% to 65% by weight of solids is maintained in this reaction zone; thus, if a relatively concentrated slurry of sodium fluosilicate is added, a relatively dilute soda ash solution may be employed, or dry soda ash may be used if a less concentrated slurry of sodium fluosilicate is used, to maintain the concentration of solids in the reaction mixture within the range above noted. Alternatively, water may be added to maintain the concentration of solids in the reactor within this range.

Reaction mixture is continuously withdrawn from the first reaction zone, a portion of this mixture returned to provide seed nuclei for further crystal growth and the remainder introduced into a second reaction zone also maintained at a temperature of 150°–220° F. Sodium hydroxide is continuously added to this second zone in amount at least equal to the stoichiometric amount required to react with all of the silicic acid introduced into this zone; preferably, an excess of caustic soda up to 5% by weight of the amount so required is employed. In the second zone the addition of the reactants is regulated to maintain from 20% to 50% by weight of solids. The reaction mixture in this zone is agitated constantly.

Reaction mixture from the second zone is withdrawn continuously and the sodium fluoride crystals separated from the soluble silicate at a temperature of above 100° F. and washed with a small amount of water. In this way contamination of the sodium fluoride product by sodium silicate is minimized, if not completely prevented.

Operating as hereinabove described large cubical sodium fluoride crystals of relatively high purity (96%–98%) are produced continuously in high yield. If smaller size crystals are desired, these large crystals may be crushed or ground to the desired particle size or the retention time of the reactants in the first reaction zone may be decreased.

The accompanying drawing, forming a part of this specification, shows a preferred layout of equipment for practicing the process of this invention. It will be understood this drawing exemplifies one arrangement of equipment in which the process may be carried out and this invention is not limited thereto.

In the drawing 10 is a closed reactor equipped with an agitator 11 and having a stack 12 leading from its top. This reactor is provided with a soda ash feed 13 of any suitable type, such as screw conveyor 14, communicating with a topper 15. It is also provided with a steam inlet 16 or other suitable heating means and with a sodium fluosilicate supply line 17. Communicating with the base of reactor 10 is a pump 18 which discharges into a classifier or splitter 19. Classifier 19 may be of any well known type capable of separating the coarser from the relatively fine crystals. For example, it may comprise an inclined cylinder 19a having a screw conveyor 19b therein. Slurry from reactor 10 is introduced into classifier 19 through line 19c leading from pump 18. In classifier 19 the coarse crystals tend to settle to the bottom and are conveyed by the slowly rotating screw conveyor to the slurry discharge line 21 which leads from the upper end of the classifier to a second reactor 22. The smaller crystals of sodium fluoride do not settle and are continuously returned to reactor 10 through line 20 for further growth. The rate of withdrawal of the large or coarse crystals may be controlled by raising or lowering the upper end of the classifier hinged as at 19d by means of a screw 19e.

Reactor 22 is of the same general type as reactor 10 and like the latter is provided with an agitator 23, a stack 24 leading from its top and a steam line 25 or other suitable heating means. Caustic soda supply line 26 communicates with reactor 22.

A pump 27 communicates with the base of reactor 22 and discharges through line 28 into a supply tank 29 provided with an agitator 30. This supply tank communicates with a filter or centrifuge 31 for effecting separation of the sodium fluoride from the sodium silicate, the latter being discharged through line 33 and the former fed through line 34 into a dryer 35. This dryer communicates with a screen 36 which in turn communicates with a mill 37. From this mill the sodium fluoride product is discharged into a storage tank 38.

The equipment should, of course, be made of material resistant to corrosion by the reactants and the reaction mixtures. Thus, for example, reactors may be lead lined vessels or carbon brick lined vessels. The remainder of the equipment should likewise be made of or lined with corrosion resistant materials.

In the preferred operation of the process a slurry of sodium fluosilicate containing from 50% to 60% by weight of the fluosilicate is fed continuously into the top of reaction 10 in which the reaction mixture is maintained at a temperature of 150° to 220° F. by the injection of live steam through line 16 or by other suitable heating means. Soda ash is continuously added by the screw conveyor 14 to the top of reactor 10. The amount of soda ash thus supplied is sufficient to maintain the pH of the reaction mixture at from 6 to 9, preferably at 7.9. The reaction mixture is constantly agitated by the agitator 11. As the reactants descend through the agitated reaction mixture reaction takes place producing sodium fluoride, silicic acid and carbon dioxide which escapes through stack 12. A portion of the reaction mixture is continuously pumped by pump 18 into the splitter or classifier 19. From this splitter or classifier 19 a portion of the reaction mixture discharges into the second reactor 22 and the remainder is returned to the reactor 10. Thus, a portion of the reaction mixture consisting chiefly of sodium fluoride and silicic acid is withdrawn from the base of reactor 10 and re-introduced into the top of this reactor; another portion of this reaction mixture also consisting chiefly of sodium fluoride and silicic acid is continuously introduced into the reactor 22.

In reactor 22 caustic soda is continuously added at the top. The reaction mixture fed through line 21 is also introduced at the top of reaction zone 22 and the resultant mixture maintained at a temperature of from 150° to 220° F., preferably 200° F., by the introduction of steam through line 25 or by other suitable heating means. To insure complete reaction of the caustic soda with the silicic acid, an excess of caustic soda over and above the stoichiometric amount required to react with the silicic acid, preferably not exceeding 5% of this amount, is maintained in the second reactor.

As the reactants descend through the reaction mixture in reactor 22, which mixture is constantly agitated by agitator 23, the caustic soda reacts with the silicic acid to form sodium silicate and water. A portion of the reaction mixture from the base of reactor 22 consisting chiefly of sodium fluoride, sodium silicate and water is continuously withdrawn by pump 27 and introduced into the supply tank 29.

The rate of supply of soda ash and sodium fluosilicate slurry to the top of reactor 10 and of reaction mixture and caustic soda to the top of reactor 22 and the rate of withdrawal of the reaction mixtures from reactors 10 and 22 are so controlled that the average retention time of each particle of reactants and resultant reaction products in reactor 10 is from 5 to 40 hours, and in reactor 22 is from 1 to 36 hours. Control of sodium fluoride crystal size is obtained by thus varying the retention time particularly in reactor 10.

From the supply tank 29 the sodium fluoride, sodium silicate and water mixture is supplied continuously to the centrifuge or other separator 31 where the sodium silicate is separated from the sodium fluoride at a temperature above 100° F. Sodium silicate is thus produced along with sodium fluoride crystals which are dried in dryer 35, passed through screen 36, and, if a smaller particle size product is desired, then ground in mill 37 to the desired particle size. The finished product is stored in storage tank 38.

The following example of the process of this invention is given for purposes of illustration only. It will be understood the invention is not limited to this example.

11,940 pounds of sodium fluosilicate is slurried with 7,950 pounds of water to form 19,890 pounds of a 60% by weight sodium fluosilicate slurry. This slurry is continuously fed at a rate of 13.8 pounds per minute to reactor 10. Steam is introduced through line 16 to maintain a reaction temperature of 200° F. 13,400 pounds of soda ash is continuously fed to this reactor at a rate of 9.43 pounds per minute maintaining the pH of the reaction mixture at 7.9. 6,710 pounds of water in addition to that employed to form the fluosilicate slurry is introduced into the reaction mixture. The total weight of reaction mixture is therefore 40,000 pounds. The reaction mixture is agitated continuously. From reactor 10 a slurry of sodium fluoride crystals and silicic acid is pumped continuously into classifier or splitter 19. From this classifier 19 a portion of the slurry flows continuously into reactor 22; the remainder is returned to reactor 10. In this example 400 pounds of the reaction mixture in reactor 10 is withdrawn per minute, and of this 400 pounds, 20 pounds per minute are fed to reactor 22 and the remainder returned to reactor 10.

Reactor 22 is maintained at a temperature of 200° F. by steam introduced through line 25. 10,260 pounds of 50% caustic soda is added through line 26 at a rate averaging 6.95 pounds per minute. This rate of feed of the caustic soda results in a 1% excess of sodium hydroxide present in reactor 22 over and above the stoichiometric amount required to react with the silicic acid. The reaction mixture in 22 is agitated continuously.

The reaction mixture is continuously pumped from the base of reactor 22 into supply tank 29. From this tank, the slurry of sodium fluoride crystals and sodium silicate solution is passed through centrifuge 31 to separate the sodium fluoride from the sodium silicate solution. The wet sodium fluoride crystals, which are relatively large and of cube shape, are then dried in dryer 35 and screened. If smaller crystals are desired, the large crystals are ground to the desired particle size.

8 tons of sodium fluoride are thus produced in 24 hours operation along with 20 tons of 30° Baumé sodium silicate solution. The average analysis of the ground sodium fluoride particles is as follows:

| | |
|---|---|
| NaF | 97.00 |
| Total SiO$_2$ as Na$_2$SiO$_3$ | 1.50 |
| Total CO$_2$ as Na$_2$CO$_3$ | 0.75 |
| Na$_2$SO$_4$ | .01 |
| NaCl | 0.04 |
| Insoluble | 0.50 |
| Moisture | 0.10 |

It will be noted this invention provides a continuous process of producing sodium fluoride from sodium fluosilicate, which process is efficient in operation, economical to carry out and results in exceptionally large cube-shaped crystals which may be used as such or ground to any desired particle size.

Since certain changes may be made in carrying out the process of this invention without departing from the scope of the invention, it is intended that all matter contained in the above description shall be interpreted as illustrative and not in a limiting sense. Thus, while it is preferred to feed the sodium fluosilicate directly to the reactor 10, it will be understood that all or a part of the sodium fluosilicate may be replaced by fluosilicic acid, which upon reaction with the soda ash is converted to sodium fluosilicate, the latter reacting with additional soda ash to produce sodium fluoride. This invention comprehends processes in which sodium fluosilicate is added as such to the first reaction zone, as well as processes in which sodium fluosilicate is formed in this reaction zone by the reaction of fluosilicic acid with the soda ash introduced into this zone.

What is claimed is:

1. A continuous process for producing sodium fluoride, which comprises continuously introducing a slurry of sodium fluosilicate into a reaction zone, continuously introducing soda ash into said reaction zone, continuously agitating the reaction mixture in said zone while maintaining said reaction mixture at a temperature of from 150° to 220° F., the rate of introduction of the soda ash relative to the rate of introduction of the sodium fluosilicate being such as to maintain the reaction mixture in said zone at a pH of from 6 to 9, continuously withdrawing a portion of the reaction mixture containing chiefly sodium fluoride and silicic acid from said zone, classifying the portion thus withdrawn into two parts, one containing smaller crystals of sodium fluoride and the other larger crystals of sodium fluoride, continuously returning the part of the reaction mixture containing the smaller crystals of sodium fluoride to the first-mentioned reaction zone, continuously passing the part of the reaction mixture containing the larger crystals of sodium fluoride into a second reaction zone, continuously adding sodium hydroxide to the second reaction zone in amount sufficient to neutralize all of the silicic acid introduced into said second reaction zone, maintaining the reaction mixture in the second zone at a temperature of from 150° to 220° F. while continuously agitating this reaction mixture, continuously removing the reaction mixture containing chiefly sodium fluoride, sodium silicate and water from said second zone, and separating sodium fluoride crystals from the sodium silicate.

2. A continuous process for producing sodium fluoride, which comprises continuously introducing a slurry of sodium fluosilicate containing at least 30% by weight of sodium fluosilicate into a reaction zone, continuously introducing soda ash into said reaction zone, continuously agitating the reaction mixture in said zone while maintaining said reaction mixture at a temperature of from 150° to 220° F., the rate of introduction of the soda ash relative to the rate of introduction of the sodium fluosilicate being such as to maintain the reaction mixture in said zone at a pH of from 6 to 9, continuously withdrawing a portion of the reaction mixture from said zone, classifying the portion thus withdrawn into two parts, one containing smaller crystals of sodium fluoride and the other larger crystals of sodium fluoride, continuously returning the part of the reaction mixture containing the smaller crystals of sodium fluoride to the first-mentioned reaction zone, continuously passing the part of the reaction mixture containing the larger crystals of sodium fluoride into a second reaction zone, continuously adding sodium hydroxide to the second reaction zone in amount sufficient to neutralize all of the silicic acid introduced into said second reaction zone and maintain an excess of up to 5% sodium hydroxide in said second-mentioned zone over and above the amount of sodium hydroxide required to react with the silicic acid introduced into said second zone, maintaining the reaction mixture in said second zone at a temperature of from 150° to 220° F. while continuously agitating this reaction mixture, continuously removing the reaction mixture containing chiefly sodium fluoride, sodium silicate and water from said second zone, and separating sodium fluoride from the sodium silicate while maintaining the reaction mixture subjected to said separation at a temperature above 100° F.

3. A process as set forth in claim 2, in which the rate of introduction of the sodium fluosilicate and soda ash and the rate of withdrawal of the reaction product from the first-mentioned zone is such that the average retention time of each particle of reactants and resultant reaction products in said first-mentioned zone is from 5 to 48 hours and the rate of introduction of the reaction mixture and sodium hydroxide into and the rate of withdrawal of the reaction mixture from said second zone is such that the average retention time of each particle of reactants and resultant reaction products in said second zone is from 1 to 36 hours.

4. A continuous process for producing sodium fluoride which comprises continuously maintaining in a first reaction zone a reaction mixture consisting essentially of the reactants, sodium fluosilicate and soda ash and the reaction products, sodium fluoride and silicic acid, at a temperature of from 150° to 220° F.; continuously agitating said reaction mixture while continuously adding said reactants thereto in amounts sufficient to maintain the reaction mixture at a pH of from 6 to 9; continuously withdrawing a portion of the reaction mixture containing chiefly sodium fluoride and silicic acid; continuously classifying the portion of the reaction mixture thus withdrawn into two parts one of which contains larger crystals of sodium fluoride and the other smaller crystals of sodium fluoride; continuously returning the part of the reaction mixture thus withdrawn containing the smaller crystals of sodium fluoride to said reaction mixture for further growth of the said smaller crystals of sodium fluoride; continuously passing the remainder of the reaction mixture thus withdrawn containing the larger crystals of sodium fluoride into a second reaction zone; continuously adding sodium hydroxide to the second reaction zone in amounts sufficient to neutralize all of the silicic acid introduced into said second reaction zone; continuously maintaining the reaction mixture in the second zone at a temperature of from 150° to 220° F. while continuously agitating this reaction mixture in the second zone; continuously removing the reaction mixture containing chiefly sodium fluoride, sodium silicate and water from the said second zone; and separating sodium fluoride crystals from the sodium silicate.

5. A continuous process for producing sodium fluoride which comprises continuously maintaining in a first reaction zone a reaction mixture consisting essentially of the reactants sodium fluosilicate and soda ash and the reaction products, sodium fluoride and silicic acid at a temperature of from 150° to 220° F.; continuously agitating said reaction mixture while continuously adding thereto sodium fluosilicate and soda ash in amounts sufficient to maintain the reaction mixture at a pH of from 6 to 9 and at a concentration to maintain from 30% to 65% by weight of solids in said first reaction zone; continuously withdrawing a portion of the reaction mixture containing chiefly sodium fluoride and silicic acid; continuously classifying the portion of the reaction mixture thus withdrawn into two parts one of which contains larger crystals of sodium fluoride and the other smaller crystals of sodium fluoride; continuously returning the part of the reaction mixture thus withdrawn containing the smaller crystals of sodium fluoride to said reaction mixture for further growth of the said smaller crystals of sodium fluoride; continuously passing the remainder of the reaction mixture thus withdrawn containing the larger crystals of sodium fluoride into a second reaction zone, continuously adding sodium hydroxide to the second reaction zone in amounts sufficient to neutralize all of the silicic acid introduced into said second reaction zone, the said remainder of the reaction mixture and the said sodium hydroxide being introduced into said second zone at a concentration to maintain from 20% to 50% by weight of solids in said second zone; continuously maintaining the reaction mixture in said second zone at a temperature of from 150° to 220° F. while continuously agitating this reaction mixture in the second zone; continuously removing the reaction mixture containing chiefly sodium fluoride, sodium silicate and water from the said second zone, and separating said sodium fluoride crystals from the sodium silicate.

EDWARD A. HEISLER.

REFERENCES CITED

The following references are of record in the file of this patent:

UNITED STATES PATENTS

| Number | Name | Date |
| --- | --- | --- |
| 1,324,030 | Bowman | Dec. 9, 1919 |
| 1,382,165 | Bishop | June 21, 1921 |
| 1,634,122 | Stevenson | June 28, 1927 |